May 19, 1959  W. H. DEVONSHIRE ET AL  2,887,213
CONVEYOR DRIVE MECHANISM
Filed Feb. 13, 1957

INVENTORS:
WILLIAM H. DEVONSHIRE
and EDWARD R. BEHNKE
BY:
Beau, Brooks, Buckley & Beau,
ATTORNEYS.

United States Patent Office 2,887,213
Patented May 19, 1959

2,887,213
CONVEYOR DRIVE MECHANISM

William H. Devonshire, Williamsville, and Edward R. Behnke, Lockport, N.Y., assignors to Columbus McKinnan Chain Corporation, Tonawanda, N.Y.

Application February 13, 1957, Serial No. 639,966

5 Claims. (Cl. 198—194)

This invention relates generally to the conveyor art, and more particularly to new and useful means for connecting a power drive chain and the like to a conveyor belt or other accessory.

It has been the practice to drive conveyor belts or flights and the like from power driven chains connected thereto. However, such chains operate over either pocket or grooved wheels, frequently in conjunction with clover leaf guide members or like devices, and when connecting the drive chain to the belt or flight by means heretofore available it has been necessary either to allow the connection device to extend outwardly beyond the chain link barrel, which interferes with free movement of the link over the drive wheels and past the guide means, or to reduce the strength of the drive chain link by cutting away a portion of its barrel.

Accordingly, it is a primary object of this invention to provide means for connecting a power chain to a conveyor belt or the like without interfering with passage of the chain over drive wheels and past guide devices and without weakening the link of the drive chain to which the connecting means is attached.

Still another object of this invention is to provide a connecting clip within which the attached drive chain link is held against rotation.

Still another object of the invention is to provide a connecting clip adapted to firmly engage the conveyor belt or flight and securely retain the same therein at all times.

It is also an object of this invention to provide a connection mechanism of the type described having the above characteristics and which is simple and relatively inexpensive in construction, durable and long lasting in operation, and readily adaptable for attaching other accessories to drive chains.

A drive chain connection means constructed in accord with this invention is characterized by the provision, in combination with a drive chain link having a body portion formed to provide recessed flats on opposite sides thereof, of a generally U-shaped clip device having a bight portion snugly embracing the body flats substantially entirely within the recesses and having opposite side legs projecting laterally from the link, the clip being secured to the link body portion against rotation relative thereto and being adapted adjacent its outer end for attachment to a driven member such as a conveyor belt.

The foregoing and other objects, advantages and characterizing features of a drive chain connection means constructed in accord with this invention will become clearly apparent from the ensuing detailed description of a presently preferred embodiment thereof, taken in conjunction with the accompanying drawing illustrating the same and forming a part hereof wherein like reference numerals denote like parts throughout the various views and wherein.

Figure 1:
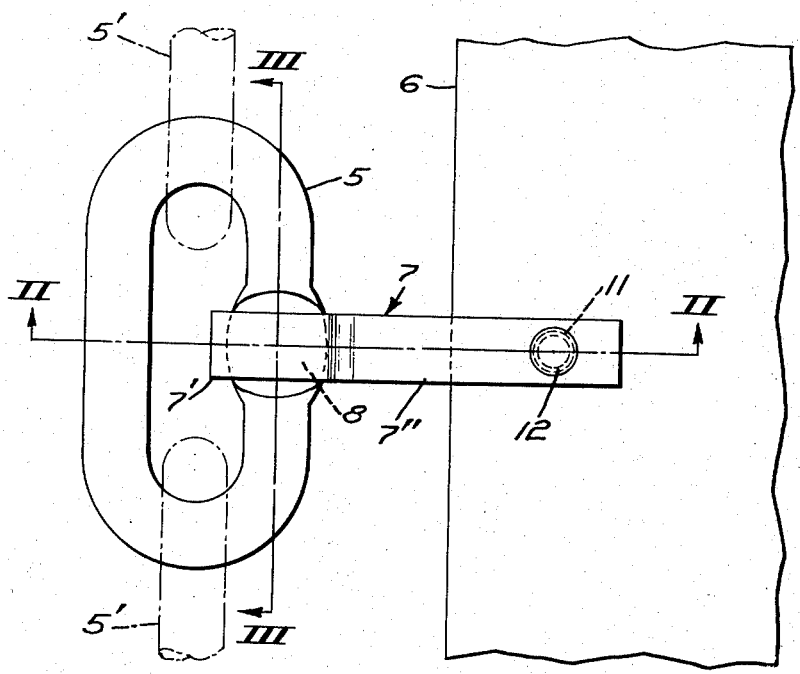
Fig. 1 is a plan view of a drive chain connected to a conveyor belt in accord with this invention.

Referring now to the embodiment of the invention illustrated in the accompanying drawing, there is shown a welded chain link 5 of the type adapted to operate over a pocket or grooved wheel and comprising one of a plurality of generally similar links 5' indicated in broken lines, all interconnected by welding in assembled relation to form a chain which can be used to drive a member such as the conveyor belt illustrated fragmentarily at 6. It is contemplated that the chain formed by links 5, 5' be of the endless type adapted to operate freely over power driven sprockets, pocket wheels, idler wheels and the like to transmit propelling force to the belt 6 or other driven member when connected thereto by the clip of the invention, generally designated 7.

The other links of the chain, indicated at 5', are distinguished from link 5 only in that they need not all necessarily have been deformed in the manner indicated below to accommodate the clip 7, and it will be understood that power driven chains 5, 5' can be disposed along each of the opposite marginal edges of belt 6 and attached thereto as by a plurality of clips 7 connected thereto and to a plurality of links 5 spaced along such chains.

In accord with the invention, a part of one side leg or barrel of link 5 is formed with opposed, recessed flats 8, this being done by the exertion of great pressure on opposite sides of the link barrel to deform the same. Thus, the opposed flat 8 reduce the normal diameter or thickness of the link barrel along one axis, and increase it along an axis at right angles thereto, while maintaining substantially the same cross sectional area, there being no loss of material.

Clip 7, which is formed of a suitable material, is of transversely substantially flat form, and is generally U-shaped to provide a bight portion 7' which snugly embraces the flats 8, and opposite side legs 7" projecting laterally from the link in spaced relation.

To secure clip 7 to link 5, and restrain rotation of the link barrel within the clip during operation of the conveyor, the clip is crimped, as indicated at 9, around the link barrel to snugly embrace the same. Where heavy loads are handled and greater strength is required, clip 7 can be otherwise and/or further secured to link 5 as by welding or riveting.

Figure 2:
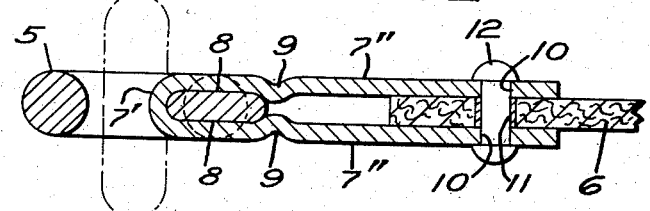
Fig. 2 is a transverse sectional view of the connecting link and a longitudinal sectional view of the connecting clip, being taken about on line II—II of Fig. 1.

The opposite side legs 7" of clip 7 receive the marginal edge of belt 6 therebetween, as clearly indicated in Fig. 2, and are provided with registering openings 10 adjacent their outer ends. Belt 6 is provided adjacent its marginal edge with a hole within which a grommet 11 can be positioned, to avoid tearing the belt, and the legs 7" of clip 7 are fastened to belt 6 by a rivet 12 or other suitable fastening passed through openings 10 and grommet 11.

Figure 3:
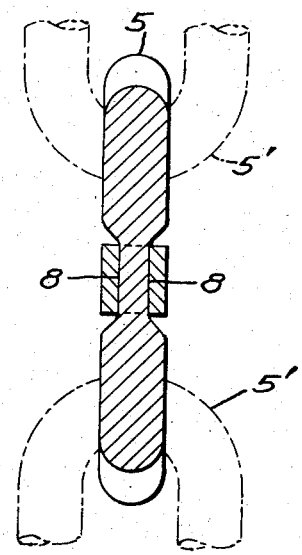
Fig. 3 is a transverse sectional view of the connecting clip and a longitudinal sectional view of the connecting link, being taken about on line III—III of Fig. 1.

In this way, clip 7 is readily and positively secured to the drive chain to belt 6 for transmitting driving force to the latter from the former, and it is a feature of the invention that the flats 8 are recessed below the opposite side margins of the link barrel to a level such that the clip 7 is confined substantially entirely within said recesses, projecting at most only slightly beyond the link, as indicated in Figs. 2 and 3, whereby interference with the drive chain wheels and guide is avoided. It is also a feature of the invention that this is accomplished without weakening the device chain link 5 because whereas merely cutting away a portion of the link would weaken it, deforming it under pressure in the manner described above and illustrated in the drawing actually increases the strength of the link. The link barrel is not cut, no portion of the link material is removed. The transverse flatness of clip 7 adds to the strength of the connection.

Accordingly, it is seen that this invention fully accomplishes its intended objects, and while only a presently preferred embodiment has been disclosed and described herein, it will be appreciated that the invention is not necessarily so limited and that variations and modification will occur to those skilled in the art without departing from the spirit of the invention and the scope of the appended claims. Also, it is contemplated that the invention can be used with other driven members, and can be adapted for use with other forms of drive chain.

Having fully disclosed and completely described our invention, together with its mode of operation, what we claim as new is:

1. Means for connecting a drive chain to a driven member comprising, a drive chain link of generally uniform predetermined cross-sectional area throughout having a body portion formed with recessed flats on opposite sides thereof, said body portion between said flats being of increased lateral thickness relative to the remainder of said link whereby the cross-sectional area of said recessed body portion is substantially equal to said predetermined area, and a generally U-shaped clip having a bight portion embracing said recessed body portion substantially within the opposite side margins thereof and having opposite side legs projecting laterally therefrom, said clip being secured to said link body portion against rotation relative thereto and being adapted adjacent its outer end for attachment to a driven member.

2. Means for connecting a drive chain to a driven member comprising, a drive chain link having a portion formed with recessed flats in opposite sides thereof, and a generally U-shaped clip having a bight portion snugly embracing said deformed portion substantially entirely within the opposite side margins of said link portion and opposite side legs extending laterally from said link, said clip being adapted for attachment to a driven member adjacent the outer ends of said side legs.

3. Means for connecting a driven member to a drive chain comprising, a drive chain link having a body portion formed with recessed flats on opposite sides thereof, and a generally U-shaped clip of transversely substantially flat form adapted to snugly embrace the recessed flats substantially within the opposite side edges of the link body portion, said clip having opposite side legs adapted to laterally project from the link for attachment to the driven member.

4. Means for connecting a drive chain to a driven member such as a conveyor belt and the like comprising, a drive chain link having a body portion formed with recessed flats in opposite sides thereof, and a generally U-shaped clip, said clip being transversely generally flat with its bight portion snugly embracing said recessed flats substantially within the opposite side margins of said body portion, the side legs of said clip extending laterally from said link in spaced apart relation to receive a driven member such as a conveyor belt and the like therebetween, and means providing opposed openings in said side leg portions to receive fastening means therethrough and through such driven member.

5. The combination comprising, a drive chain link having a body portion formed to provide recessed flats in the opposite sides thereof, a generally U-shaped clip having a bight portion snugly embracing said flats substantially within the opposite side margins of said body portion, said clip being transversely substantially flat with side legs projecting laterally from said link in spaced apart relation, a driven belt fitted between said side legs, and fastener means securing said side legs to said belt.

References Cited in the file of this patent

UNITED STATES PATENTS

| | | |
|---|---|---|
| 1,069,536 | Dodge | Aug. 5, 1913 |
| 2,757,784 | Von Stroh et al. | Aug. 7, 1956 |

UNITED STATES PATENT OFFICE

CERTIFICATE OF CORRECTION

Patent No. 2,887,213                                                       May 19, 1959

William H. Devonshire et al.

It is hereby certified that error appears in the above numbered patent requiring correction and that the said Letters Patent should read as corrected below.

In the grant, lines 2 and 3, and 12, and in the heading to the printe specification, lines 4 and 5, name of assignee, for "Columbus McKinnan Cha Corporation", each occurrence, read -- Columbus McKinnon Chain Corporatior column 2, line 56, after "chain" insert -- and --; line 65, for "device" read -- drive --.

Signed and sealed this 1st day of December 1959.

(SEAL)
Attest:

KARL H. AXLINE                                                  ROBERT C. WATSON
Attesting Officer                                          Commissioner of Patents